United States Patent [19]

Leopold

[11] 4,332,362
[45] Jun. 1, 1982

[54] TELEPHONE NOTE CLIP

[75] Inventor: Norbert Leopold, Chicago, Ill.

[73] Assignee: The Cloverline Inc., Chicago, Ill.

[21] Appl. No.: 128,734

[22] Filed: Mar. 10, 1980

[51] Int. Cl.³ .......................... G09F 3/00; A44B 21/00
[52] U.S. Cl. .................................. 248/226.5; 24/341;
                                                 40/336; 403/69
[58] Field of Search ...................... 24/67.11, 214, 300,
          24/336, 341; 248/226.5, 229; 40/336, 339;
                                                        403/69

[56] References Cited

U.S. PATENT DOCUMENTS

| 942,366 | 12/1909 | Deeter | 24/336 X |
|---|---|---|---|
| 1,107,306 | 8/1914 | Hick | 24/67.11 |
| 1,540,556 | 6/1925 | Laurie | 248/229 X |
| 1,745,548 | 2/1930 | Lerner | 24/336 |
| 1,840,206 | 1/1932 | Kraft | 24/67.11 |
| 1,840,409 | 1/1932 | Randall | 24/67.11 |
| 2,553,853 | 5/1951 | Fisher | 248/229 X |
| 2,564,517 | 8/1951 | Beals | 248/229 |
| 2,795,877 | 6/1957 | Falk | 40/336 |
| 3,248,765 | 5/1966 | Achabal | 24/336 X |
| 3,587,188 | 6/1971 | Dietrich | 40/336 |
| 4,077,521 | 3/1978 | Alkins | 248/226.5 X |
| 4,159,403 | 6/1979 | Sangster | 40/336 X |

FOREIGN PATENT DOCUMENTS 2307003   8/1973   Fed. Rep. of Germany ........ 403/69

Primary Examiner—Werner H. Schroeder
Assistant Examiner—Andrew M. Falik
Attorney, Agent, or Firm—McWilliams, Mann & Zummer

[57] ABSTRACT

The invention relates to a telephone note holder in the form of a two piece molded clip that may be assembled by snapping the two parts together after which the assembled note holder may be clipped into place on a cradle type telephone and which includes an upright portion having a spring clip for holding notes.

2 Claims, 5 Drawing Figures

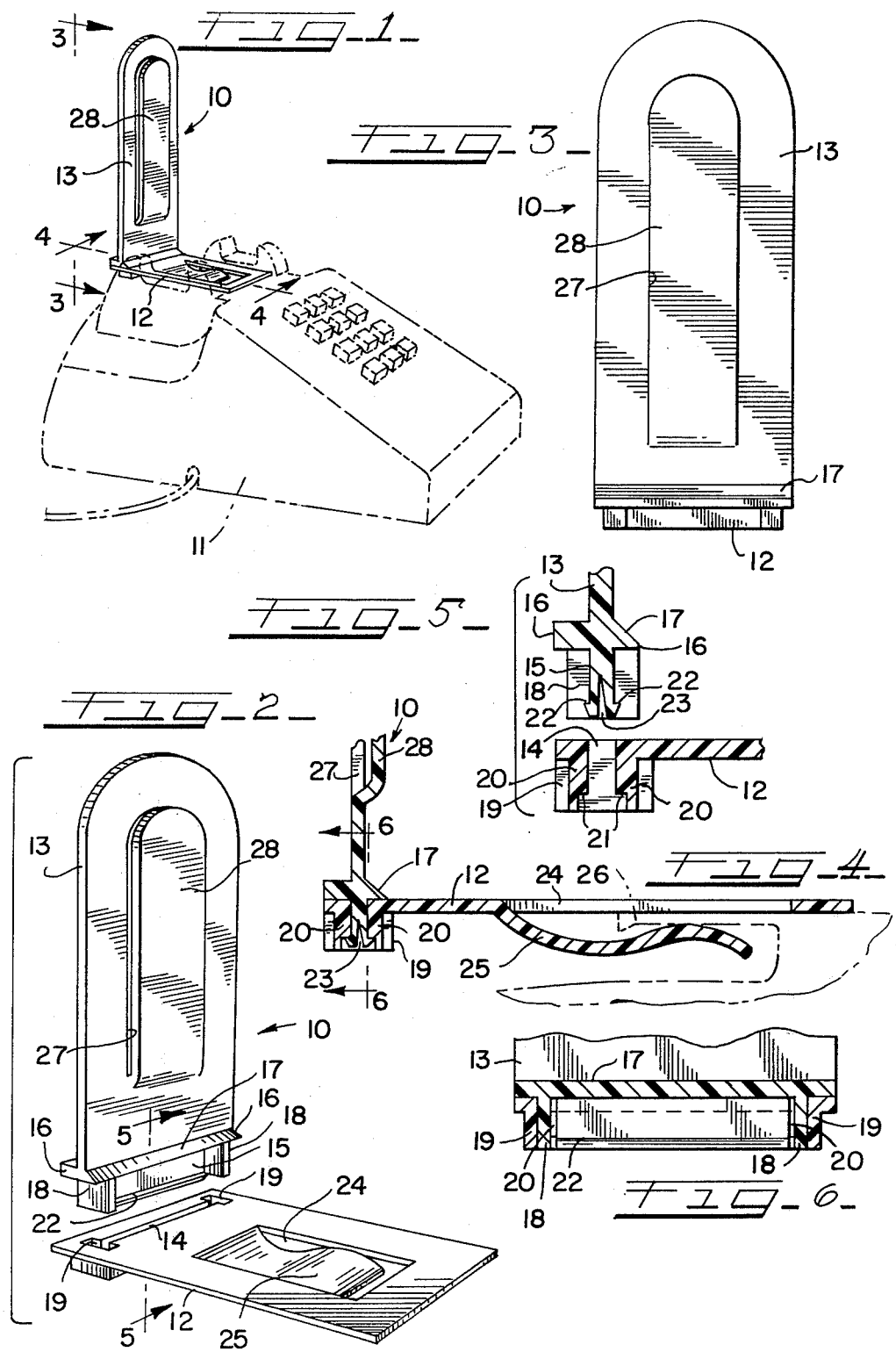

TELEPHONE NOTE CLIP

BACKGROUND OF THE INVENTION

1. Field of the Invention

The invention relates to telephone note holders of a type that is adapted to be associated directly with a typical telephone set as a convenient holder for memos made while using the phone or reminders to be utilized when next using the phone as a means of recalling something to be done or inquire about.

2. Description of the Prior Art

Note holders for utilization in conjunction with the use of a phone have been available in the prior art but these have not been of a type for direct attachment to a telephone set. Some of these prior holders involved separate containers for a supply of note paper, or a snap open holder which necessitated dialing a particular setting to open the holder for access to the contents. A simple form of retaining notes comprised nothing more than a spindle placed near the phone location but which perforated a note when it was placed thereon for storage until utilized later. None of these earlier devices included a clip-on type of note holder which attached directly to a telephone set to readily hold one or more memos for reference while using the phone.

SUMMARY OF THE INVENTION

This invention provides a telephone note clip that incorporates a spring clip for attaching the note holder to a telephone of the cradle type and also has a spring clip that may be utilized to retain a memorandum note for reference while using the phone or for making a note record during a phone conversation. The telephone note clip is of molded construction made from a suitable plastic material which may be clear or colored, as desired. The molded clip structure is made in two parts for compact packaging and which are adapted to be snapped together to provide a base portion containing the spring clip for attachment to the phone and an upright portion containing the spring clip for retention of notes made at the time of using the phone or stored there as a reminder when the phone is next used. Both of the spring clips are formed integrally with the molded clip structure. The two parts, while having a snap-fit for ready assembly, may just as readily be taken apart by releasing the snap-fitted parts and separating the two pieces.

OBJECTS OF THE INVENTION

The primary purpose of the invention is to provide a memo-holder that can be clipped directly to a telephone set.

The principal object of the invention is the provision of a telephone note clip for direct attachment to a telephone set and having a separate spring clip for holding the note clip to the phone and for holding one or more notes or memos convenient to the phone.

Another object of the invention is to provide a telephone note clip having a base portion for attachment to a telephone set and an upright portion containing an integral note holder clip for retaining a memo.

A further object of the invention is the provision of a telephone note clip of molded plastic material made in two parts comprised of a base and an upright containing a clip for notes and wherein the two parts are secured together by a snap fit.

A still further object of the invention is to provide a telephone note clip having a base portion containing a spring clip for attachment to a telephone set and an upright portion containing a spring clip for securement of one or more reminder notes.

The foregoing and other and more specific objects of the invention are attained by the construction and arrangement illustrated in the accompanying drawings wherein FIG. 1 is a general perspective view illustrating the telephone note clip mounted on a telephone set of the typical cradle type;

FIG. 2 is an exploded perspective view of the telephone note clip showing the two parts ready for final assembly;

FIG. 3 is a rear elevational view of the telephone note clip looking from the plane indicated at 3—3 in FIG. 1.

FIG. 4 is a detail horizontal sectional view of the telephone note clip taken on the line 4—4 of FIG. 1 showing the integral spring clip for attachment to a telephone part;

FIG. 5 is a fragmentary exploded view revealing the details of the means for attaching the two parts of the note clip together; and FIG. 6 is a detail sectional view taken on the line 6—6 of FIG. 4 showing the interengaged parts of the upright and horizontal parts of the note clip.

DESCRIPTION OF PREFERRED EMBODIMENT

In the drawings the reference character 10 generally indicates a note clip for attachment to a cradle type telephone set, indicated at 11 and including a base portion 12 and an upright portion 13. The base portion and the upright portion comprise separate parts that are each molded from a suitable plastic material having the desired characteristics such as the necessary strength and rigidity and affording smooth surfaces without blemishes or rough projections to provide a telephone clip both pleasing to the view and to the touch.

In order to assemble the two parts 12 and 13 to provide a unitary telephone clip structure comprised of the base portion and the upright portion, the base portion 12 is here shown as having a vertical slot 14 that extends transversely of the base and is designed to receive a corresponding tongue 15 on the upright 13. While the tongue 15 and slot 14 are here shown as being disposed in association with the upright 13 and base 12 respectively, it is entirely possible that these elements might be reversed and the tongue formed on the base portion and the slot formed in the upright structure without departing from the basic concept.

The tongue 15 is molded integrally with the upright portion 13 and as shown, is disposed in depending relationship with respect to a base flange 16 that extends rearwardly of the upright and in a forward direction toward the telephone 11. This latter flange element is beveled, as at 17, to provide a downwardly sloping surface, The tongue 15 incorporates opposite vertical end walls 18 that are of integral construction and which are disposed in perpendicular relation to the transversely extending tongue element. The end walls 18 are disposed inwardly of the side edges of the upright 13 and are of the same vertical height as the tongue 15.

The slot 14 in the base portion 12 incorporates correspondingly shaped end portions 19 adapted to cooperate with the end walls 18 on the tongue 15 when the parts 12 and 13 are assembled to complete the telephone clip. The slot 14 extends below the underside of the base portion and is defined by opposite side walls 20 of the same vertical depth as the opposite end portions 19. At the bottom of the slot the opposite side walls 20 are each provided with an undercut edge 21 which faces toward the slot 14. When the two parts 12 and 13 are assembled the tongue 15 is inserted downwardly into the slot 14 with the end walls 18 entering the corresponding end portions 19 of the slot. The relationship of the tongue 15 and end walls 18 with the slot 14 and end portions 19 in a closely fitting engagement to hold the upright portion 13 rigidly in a perpendicular relationship to the base portion 12 without any relative movement between the parts. This rigid relationship is enhanced and reinforced by the engagement of the base flange 16 on the upright with the top surface of the top surface of the base 12 to maintain the upright portion in right angular relationship with the base portion.

The interengaged relationship of the tongue and slot is maintained by an interlocking engagement at the bottom edges of the tongue 15 with the undercut edges 21 of the slot 14. The tongue 15 is provided with outwardly projecting edges 22 extending in opposite directions and when the tongue is fully inserted into the slot 14 these bottom edges 22 provide outstanding lips which underlie the respective undercut edges 21 at the bottom of the slot, thus effectively securing the two parts together against any possibility of accidental separation. In order to insert the tongue 15 into the slot 14 it will be seen that the projecting bottom edges 22 must be compressed inwardly in order for the tongue to be entered into the slot. For this purpose the tongue at its lower end is provided with an upwardly extending space 23 which enables the two oppositely projecting edges 22 to be contracted to an extent not exceeding the width of the slot 14, whereby the tongue can be inserted into the slot and when entered fully the lips 22 spring back into their positions underlying the undercuts 21 and thereby securely hold the two parts together.

The telephone clip 10 is adapted to be clipped onto a typical cradle type telephone set and it is the base portion 12 that is mounted relative to the telephone 11. The base portion includes a more or less centrally disposed rectangular opening 24. A spring clip 25 is formed integrally with the base portion in the area of the opening 24. This spring clip is integrated with the base 12 at its rear end and the front end of the clip is free and is formed on a downwardly extending curve so that the clip may readily be inserted under the finger shelf 26 normally provided on telephone sets of this type with the base portion 12 overlying this part of the phone and extending between the cradle portions for the handset so that the shelf 26 is gripped between the spring clip 25 and the base 12 thus securely holding the telephone clip 10 on the telephone set.

The primary purpose of the telephone clip is to provide a convenient means of retaining one or more notes or memos adjacent to the telephone and for this purpose the upright portion 13 is provided with an oblong opening 17 extending vertically of the upright. A spring clip 28 is integrated with the upright portion 13 at the bottom end of the spring clip and extends substantially full height of the opening 27 with the top end of the clip being free to facilitate the insertion of a card or piece of note paper behind the spring clip where it is pressed between the clip and the upright to retain the note for ready reference. Both of the spring clips 25 and 28 have been described as related to the respective openings 24 and 27 but it should be understood that since the two parts 12 and 13 are of molded construction the openings could be dispensed with so that the spring clips would then be disposed directly related to the opposing solid surface of the base 12 or the upright 13 as the case may be.

From the foregoing it will be seen that a telephone clip has been provided which is molded in two parts for ready packaging and which may be easily and quickly assembled by a snap-fit connection and having a spring clip for securement to a telephone set and a spring clip for holding one or more notes adjacent to the telephone.

What is claimed is:

1. A telephone note clip comprised of a base portion and an upright portion, said base portion having a fastening device for removably securing the note clip to a telephone set, said upright portion having a note retaining member on a face thereof directed toward the telephone, said fastening device and said retaining member being integral with said base portion and upright portion respectively, said base portion and said upright portion being made from a molded plastic material and comprise separately molded parts, said separately molded parts being secured together by a snap-fit, said snap-fit including an open slot in one of the parts and a tongue on the other part entered into said slot, and oppositly projecting edges on the tongue in opposed relation to opposite edges of the slot to prevent withdrawal of the tongue, said tongue being provided with vertical end walls disposed perpendicular to the tongue and said slot includes end portions correspondingly shaped to receive said end walls.

2. A telephone note clip as set forth in claim 1 wherein said upright portion includes a generally horizontal base flange extending to both sides thereof, said flange toward the telephone being beveled to provide a downwardly sloping surface.

* * * * *